United States Patent [19]

Kameda

[11] Patent Number: 4,696,580

[45] Date of Patent: Sep. 29, 1987

[54] METHOD FOR DETECTING STERILIZATION

[75] Inventor: Toshinori Kameda, Ibaraki, Japan

[73] Assignee: National Can Corporation, Chicago, Ill.

[21] Appl. No.: 835,692

[22] Filed: Mar. 3, 1986

[30] Foreign Application Priority Data

May 16, 1985 [JP] Japan .................................. 60-102772

[51] Int. Cl.[4] ...................... G01K 11/12; G01N 25/00
[52] U.S. Cl. ........................................ 374/162; 374/17;
426/88; 426/383; 426/407; 436/1
[58] Field of Search ................. 374/45, 161, 150, 162;
116/207; 141/51; 426/88; 73/49.3, 52; 436/1

[56] References Cited

U.S. PATENT DOCUMENTS

| | | | |
|---|---|---|---|
| 1,924,793 | 8/1933 | Laske | 116/207 |
| 2,251,345 | 8/1941 | Triplett | 426/88 |
| 3,290,922 | 12/1966 | Thompson | 73/52 |
| 3,360,337 | 12/1967 | Edenbaum et al. | 116/207 |
| 3,568,627 | 3/1971 | Flushing | 116/207 |
| 3,667,916 | 6/1972 | Sliva et al. | 116/207 X |
| 3,734,276 | 5/1973 | Bank | 426/383 X |
| 3,736,861 | 6/1973 | Kroyer et al. | 374/162 X |
| 4,148,223 | 4/1979 | Disinski | 436/1 X |
| 4,280,441 | 7/1981 | McNeely | 374/161 X |
| 4,292,916 | 10/1981 | Bradley et al. | 426/88 X |
| 4,424,990 | 1/1984 | White et al. | 374/161 |

FOREIGN PATENT DOCUMENTS 2426249 12/1979 France .................................. 374/162

Primary Examiner—Daniel M. Yasich
Attorney, Agent, or Firm—Robert A. Stenzel; Ralph R. Rath

[57] ABSTRACT

A can container made of soft material such as aluminum having a wall thickness of less than 0.2 mm is used for low acid foods or drinks having pH of more than 5.0. A controlled quantity of liquified nitrogen is introduced into the can filled with the low acid foods or drinks and then the can is hermetically sealed off by double-seaming. The liquid nitrogen is soon gasified in the sealed can to increase internal pressure of the can to a level sufficient to prevent the can from being deformed. Then the can is subjected to retort sterilization treatment at a predetermined high steam temperature for a predetermined period of time for sterilization of any possible bacilli and bacteria in the low acid foods or drinks in the can. Prior to retort sterilization treatment, a thermal sensitive paint is applied to the can, which will change color when exposed to a steam of a predetermined temperature for a predetermined period. Unchanged color of the thermal sensitive paint will mean a possibility that the low acid foods or drinks fail to be effectively sterilized and contain numerous bacilli and bacteria. Deformed can means insufficient internal pressure created therein caused by incomplete sealing of the can.

7 Claims, 1 Drawing Figure

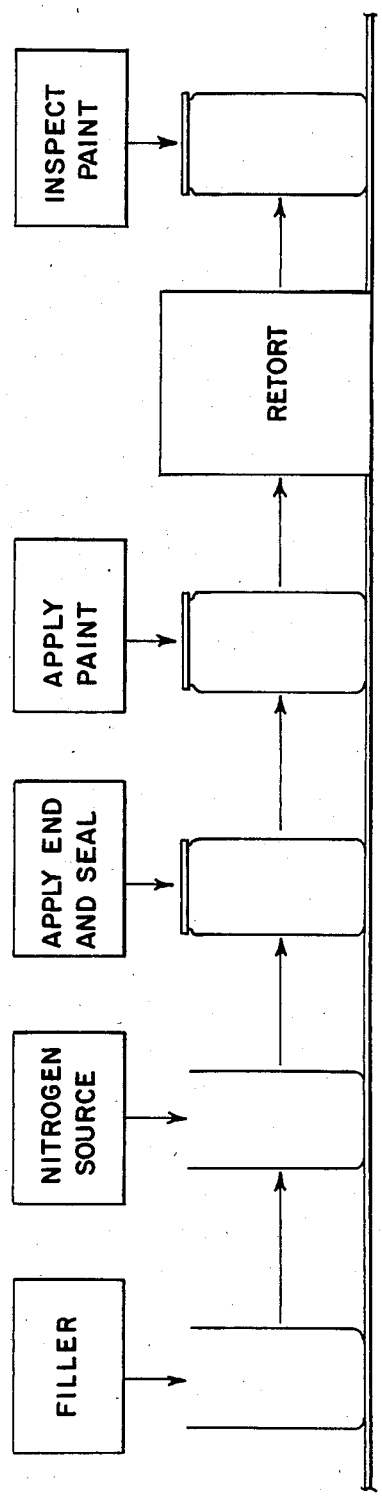

METHOD FOR DETECTING STERILIZATION

BACKGROUND OF THE INVENTION

1. Field of the Invention

The present invention is directed in general to the field of a thin wall thickness container filling and sterilizing system and more particularly to a method for detection of sterilization effect of a hermetically sealed thin wall can containing low acid foods or drinks.

2. Description of the Prior Art

There have been provided various types of canned foods or drinks. Coffee, cocoa, tea, cornsoup, carbonated beverages and the like are filled in cans such as ring-pull cans and pop-top cans, and the cans are hermetically sealed by double-seaming. Such canned foods or drinks are readily available at an automat, for example.

One of problems for many canned foods/drinks manufacturers is to sterilize the foods/drinks contained in hermetically sealed cans. This problem becomes serious when a low acid food, which is generally referred to as having pH value of more than 5, including coffee, cocoa, tea and cornsoup, is to be filled in the can. Since some kinds of bacilli or bacteria, typically *"Bacillus stearothermophilus"*, remains in the low acid food even after being subjected to sterilization at a temperature level of 100° C. or lower, retort sterilization must be applied to the can containing the low acid food at a higher temperature, preferably at around 120° C. or more, for a predetermined period of time, requiring that the can has as its own mechanical characterisitics a high strength and a shape retaining property well resistant to the high temperature sterilization treatment. Consequently, in the prior art hard steel cans (including three-piece steel cans) having wall thickness of about 0.3 mm or more have been used for containing the low acid food.

After the high temperature retort sterilization treatment is applied to the hermetically sealed steel can in which the low acid food has been filled, the can is subjected to a known type of tapping test to confirm if the sterilization is perfectly effected. In case the sterilization effect is not perfect to propagate bacteria in the low acid food, only a skilled man can hear an extraordinary sound or tap tone in the tapping test to realize incompleteness of the sterilization. Such canned foods or drinks are, of course, omitted from commercialization and shipment. Especially in winter season or in cold areas, the can containing a liquid beverage is often heated to a temperature comfortable to drink, say 50° C., at which temperature the *Bacillus stearothermophilus* and some other kinds of bacilli and bacteria will grow to a tremendous number.

Accordingly, the retort sterilization treatment must be carefully and effectively carried out to completely eradicate the bacilli and bacteria possibly present in the low acid foods.

The above-described conventional method is applied only to a hard steel can. Recent trend is, however, that the hard steel can is replaced by an aluminum soft can having a wall thickness of 0.10–0.15 mm in view of lighter weight, better cost performance and workability, and easier transportation and loading. Moreover, Fe+ ions on the inner wall of steel cans tend to be dissolved in liquid beverages contains therein as the time passes, to thereby deteriorate and degrade the liquid beverage in taste.

When a thin wall soft aluminum can is filled with a liquid beverage, it is required to inject liquified nitrogen into the can, together with the liquid beverage, and immediately after that the can is hermetically sealed by double-seaming. The injected liquid nitrogen is soon gasified to create the internal pressure of the can which will reach a sufficient degree for providing a can strength and maintaining a given shape of the can.

If such a thin wall soft aluminum can is intended to use for containing a low acid food, it will be necessary to apply the retort sterilization at a high temperature of about 120° C. for a predetermined interval, as described hereinbefore. The internal pressure of the can will increase as temperature rises during the sterilization, to more than 1.2 $kg/cm^2$ G, for example. Such internal pressure level is found to be sufficient to prevent deformation of the can. However, in practice, there has been known no means for detection of completeness of the sterilization. The tapping test is not available for the aluminum soft can because no sensible sound or tone difference can be heard at a pressure level of more than 1.2 $kg/cm^2$ G.

In the retort sterilization operation, as known, a retort furnace is evacuated to remove oxide gas therein and then a high temperature steam is introduced into the retort furnace, wherein the cans containing low acid foods or drinks are subjected to the retort sterilization at a prescribed temperature for a prescribed interval. If the retort furnace is not effectively evacuated to remain a quantity of oxide gas therein, due to poor thermal conductivity of the oxide gas, a portion of the cans in the retort furnace are not subjected to a steam of the prescribed temperature, resulting in poor and incomplete retort sterilization effect being applied to the foods/drinks containes in said portion of cans. In the event of failure of the steam temperature control system to operate effectively, a desired retort sterilization effect can not be obtained while not attracting the operators' attention to that fact. No method has been known for detecting and confirming completeness of the retort sterilization effect when a soft type can is used and filled with low acid foods or drinks.

Under the circumstances, the thin wall soft aluminum cans have been recognized unsuitable for containing the low acid foods despite their suitability to can materials.

SUMMARY OF THE INVENTION

It is therefore an object of the present invention to overcome and eliminate the disadvantages encountered with prior art in the canned food manufacturing fields.

An object of the present invention is to provide a novel method for detecting incompleteness of retort sterilization treatment applied to a canned low acid food, whereby making it possible and easier to use thin wall aluminum soft can containers for containing low acid foods.

Another object of the invention is to provide a low acid food contained in a double-seamed thin wall aluminum soft can, which is sufficiently sterilized and ready to be put on the market.

Still another object of the invention is to provide a method which is capable of producing a canned low acid food with good taste and flavor and at a low manufacturing cost.

Yet another object of the invention is the provision for the new use of conventionally known thermal sensitive paint or ink materials.

According to an aspect of the present invention there is provided a method for detecting sterilization effect applied to a thin wall soft type can filled with low acid foods or drinks, which comprises the steps of applying a thermal sensitive paint to the can which is already filled with the low acid foods or drinks and hermetically sealed off, the thermal sensitive paint having its inherent nature of manifesting a visible color change when exposed to a steam of a predetermined temperature for a predetermined interval which corresponds to desired conditions for retort sterilization treatment to be applied to the low acid foods or drinks; applying the retort sterilization treatment to the low acid foods or drinks contained in the can; and detaching the visible color change of thermal sensitive paint of the can so that the can with the thermal sensitive paint manifesting no visible color change is regarded as having been subjected to incomplete retort sterilization.

According to another aspect of the present invention there is provided a method for manufacturing canned products of low acid drinks which comprises the steps of preparing cans made of soft material having a wall thickness of less than 0.2 mm; filling the cans with low acid foods or drinks having pH value of more than 5.0; introducing a quantity of liquid nitroen into the cans; hermetically sealing the cans containing the low acid foods or drinks immediately after the quantity of liquid nitrogen is introduced thereinto, the liquid nitrogen being gassified in the cans to increase internal pressure thereof; applying thermal sensitive paints to the respective cans, the thermal sensitive paints having inherent nature of manifesting visible color change when exposed to steam of a predetermined temperature for a predetermined interval which corresponds to desired conditions for retort sterilization treatment to be applied to the low acid foods or drinks contained in the cans; applying the retort sterilization treatment to the low acid foods or drinks contained in the cans; detecting the visible color change of the thermal sensitive paints of the cans so that the cans with the thermal sensitive paints manifesting no visible color change are regarded as having been failed to get complete retort sterilization effect; classifying the cans into superior goods having the thermal sensitive paints manifesting visible color change and inferior goods having the thermal sensitive paints manifesting no visible color change; and removing the inferior goods from a supply line.

According to still another aspect of the present invention there is provided a method for detecting inferior goods among thin wall soft type cans which have been filled with low acid foods or drinks having pH value of more than 5.0 and a quantity of liquid nitrogen, then hermetically sealed and then subjected to retort sterilization treatment at a predetermined steam temperature for a predetermined period, the quantity of the liquid nitrogen being gassified in the cans to increase internal pressure thereof to a predetermined pressure level, which comprises the steps of applying thermal sensitive paints to the respective cans prior to the retort sterilization treatment, the thermal sensitive paints having inherent nature of manifesting visible color change when exposed to steam of a predetermined temperature for a predetermined period which corresponds to the conditions for the retort sterilization treatment; detecting the visible color change of the thermal sensitive paints of the cans so that the cans with the thermal sensitive paints manifesting no visible color change are regarded as having been failed to get complete retort sterilization effect; detecting presence of cans having internal pressure not reached to the predetermined pressure level; and thus detecting inferior goods among the canned foods which have the thermal sensitive paints manifesting no visible color change and internal pressure unreached to said predetermined pressure level.

The thermal sensitive paint used in the present invention is preferably prepared as an ink and a date of packing and any other marks or descriptions represented on the outer wall of the can are printed with the ink made of thermal sensitive paint material.

BRIEF DESCRIPTION OF DRAWINGS

The single drawing FIGURE is a schematic illustration of the method of the present invention.

DETAILED DESCRIPTION

When a thin wall soft can typically made of aluminum is filled with liquid beverage not containing carbon dioxide, for example, coffee, cocoa, tea and cornsoup, the internal pressure is not created in the can even after the can filled with the liquid beverage is hermetically sealed by double-seaming. Accordingly, it is required to inject a quantity of liquid nitrogen into the can so that, after double-seaming the can, the liquid nitrogen is gasified in the hermetically sealed can to create the internal pressure. The quantity of liquid nitrogen in each can is dependent upon the size of the can and the desired internal pressure. In general, at a temperature of 20° C. the internal pressure of 1.3–1.8 $kg/cm^2$ G is preferred with a permissible difference of $\pm 0.3$ $kg/cm^2$ G. The control system for creating and maintaining the desired internal pressure of the can is disclosed in U.S. Pat. No. 4,583,346 entitled "Method and Apparatus for Pressurizing Containers" in which a head space pressure of a liquid nitrogen reservoir is definitely controlled by a computer and a valve arrangement so that a controlled quantity of liquid nitrogen is supplied therefrom to an injection gun at a constant conveyance rate. The operational conditions of the injection gun (operating period, interval and timing, etc.) are also regulated. The upper opening of the can into which a predetermined quantity of liquid nitrogen has been injected is sealed off without delay, to prevent the gasified nitrogen from escaping out of the can to the atmosphere. The sealed can is brought to a retort furnace where the can is subjected to retort sterilization at about 120°–140° C. for 40–10 minutes, in a known manner.

Prior to the retort sterilization treatment, a heat sensitive paint is applied to the outer wall of the can. What is referred to as "heat sensitive paint" used throughout this Specification and Claims in any paint or ink material which will change its original color to a different color when exposed to a steam atmosphere at a predetermined temperature for a predetermined period. Some kinds of such ink or paint materials are presently manufactured by Easterday Fluid Technologie, Inc., a Wisconsin corporation and The Cardinal Corporation, a California corporation, for example, and therefore ready to come to hand. A heat sensitive paint to be used in the present invention must provide a notable change in color by the retort sterilization treatment at 120°–140° C. for 40–10 minutes. For example, the product number #N-30 made by Easterday Fluid Technologie, Inc., which will change from red to green when it reacts to steam at 255° F. for about 10 minutes has been found appropriate to suffice the requirements of the present invention.

The heat sensitive paint is applied to the can by a brush or jet sprayed onto the can. Alternatively, a tape with a coating of the heat sensitive paint is put or adhered to the outer wall of can. The heat sensitive paint applying procedure must be done prior to the retort sterilization, but may be either before or after the can sealing operation. The can containers may in advance be provided with a thermosensitive mark of the heat sensitive paint on any position easy to find.

The heat sensitive paint will change color after the retort sterilization is completed at a predetermined temperature for a predetermined period, which means that the retort sterilization for tha can having the color-changed heat sensitive paint has been completely effected, whereas the can having the heat sensitive paint whose color remains unchanged would have failed to be effectively subjected to the retort sterilization and may contain therein numerous bacilli and/or bacteria. Preferably, an automatic system is provided for sequentially detecting color change of cans, classifying color-changed cans and unchanged cans, and removing the latter cans from a belt conveyor or the like supply line.

The heat sensitive paint may preferably be prepared as a printing ink. Canned foods must in most cases carry the date of packing and/or the manufacturer's code number on their labels or on the bottom of the can. When such a printing ink as being made of the heat sensitive paint is used to mark the date of packing and/or the manufacturer's code number, the sterilization effect can be confirmed by their marks themselves. This will require no other special mark on the outer wall of the can and therefore the purpose of the present invention may be achieved without marring a beautiful design and appearance of the can.

According to the present invention, a low acid foods or drinks is packaged in a thin wall can made of a soft material such as aluminum rather than a hard steel can having a considerable wall thickness. In case the double-seaming of the thin wall soft can should not completely be effected, liquid nitrogen having been introduced in the can would be soon gasified therein and then leak out of the can by degree, resulting in substantial decrease in the internal pressure of the can. When at last the internal pressure lowers below a given level the can will readily become deformed. In other words, deformed cans which could be found in a predetermined time after the sealing operation will means incompleteness of the sealing operation and therefore have to cut out of the supply line. Alternatively, sustantial decrease in the internal pressure of the can may be detected by the tapping test. The internal pressure of the can of a type which is made of a soft material, that is the can referred to in the present invention, must be increased by liquid nitrogen gasified in the can and maintained at a relatively high value, say 1.3–1.8 $kg/cm^2 G$. If the can sealing operation is not completely effected, the internal pressure will be decreased to a much lower level, 30 cmHg ±0.5 $kg/cm^2 G$, for example, and this decrease in the internal pressure of the can may easily be detected by the tapping test with automatic tapping test machine of a known type.

For better understanding of the present invention some examples will be given hereunder.

EXAMPLE 1

So-called a 200/202/504 aluminum can of 2 inches in caliber, 2-2/16 inches in body diameter and 5-4/16 inches in height, having a wall thickness of 0.13 mm and a capacity of 250 ml, was used for containing milk coffee of pH 6.5. Quantities of the milk coffee in the respective cans were measured with a detector which produced a signal through a computer and a timer to a liquid nitrogen injector, with which liquid nitrogen in a predetermined quantity corresponding the the quantity of the milk coffee filled in the respective cans was injected thereinto. Then the cans were hermetically sealed off by applying lids thereonto. After the can sealing operation, a thermal sensitive fluid provided by The Cardinal Company, in the state of California, U.S.A., was sprayed onto the respective cans at upper portions thereof in a section of 16 $mm^2$ area. The thermal sensitive fluid used in this example will change color from red to green in response to thermal treatment of a steam temperature of 120° C. for 20 minutes.

The sealed cans having sections coated with the thermal sensitive fluid were then subject to retort sterilization at 120° C. for 20 minutes with a batch type device, and then cooled. The internal pressure of the can of 1.5 $kg/cm^2 G$ was determined as a standard value with an allowance of ±0.4 $kg/cm^2 G$ so that the cans having internal pressure of less than 1.1 $kg/cm^2 G$ were considered as inferior goods to be removed from the supply line. Also, a test was made to confirm if the red colored thermal sensitive fluid coating sections of the cans were changed to green. The cans having no visible color change of the coating sections were inferior goods which may have been incompletely sterilized and thus removed from the line. Among 20,000 cans manufactured in the above described manner were 242 cans removed from the line as they manifested no visible color change. The remaining cans were opened after 10 days to confirm the test results and no change in taste and flavor, no deterioration and no decomposition of the milk coffee therein was found.

EXAMPLE 2

The same can and the same thermal sensitive fluid as used in Example 1 were used. The thermal sensitive fluid was applied to the bottom of the respective cans in a section of 25 $mm^2$ area and then the cans were filled with cocoa. The liquid nitrogen injection, sealing and retort sterilization operation were carried out in the same manner, respectively. In this example 121 of 20,000 cans were inferior goods and the residue remained unchanged and undenatured even after 10 days.

Although the foregoing description is directed to specific embodiments of the invention, it is to be understood that the present invention can not be limited to the desired embodiments and may include many modifications and variations without departing from the spirits and scopes thereof as defined in appended claims.

What I claim is:

1. A method for detecting sterilization effect applied to a thin wall soft type can, such as aluminum, filled with low acid foods or drinks, which comprises the steps of applying a thermal sensitive paint in the form of descriptions or marks to an exterior surface of said can which is already filled with said low acid foods or drinks and hermetrically sealed off, said thermal sensitive paint having its inherent nature of manifesting a visible color change when exposed to a steam of a predetermined temperature for a predetermined interval which corresponds to desired conditions for retort sterilization treatment to be applied to said low acid foods or drinks; applying said retort sterilization treatment to said low acid foods or drinks contained in said can; and detecting said visible color change of said thermal sensitive paint of said can so that said can with said thermal sensitive paint manifesting no visible color chane is regarded as having been subjected to incomplete retort sterilization.

2. The method as claimed in claim 1, wherein said thermal sensitive paint is prepared as a printing ink and said descriptions or marks of said including a date of packing of said can are marked on said exterior surface thereof with said ink made of said thermal sensitive paint.

3. A method for manufacturing canned products of low acid drinks which comprises the steps of preparing cans made of soft material, such as aluminum, having a wall thickness of less than 0.2 mm; filling said cans with low acid foods or drinks having pH value of more than 5.0; introducing a quantity of liquid nitrogen into said cans; hermetically sealing said cans containing said low acid foods or drinks immediately after said quantity of said liquid nitrogen is introduced thereinto, said liquid nitrogen being gasified in said cans to increase internal pressure of said cans; applying thermal sensitive paints to the exterior surface of said respective cans, said thermal sensitive paints having inherent nature of manifesting visible color change when exposed to a steam of a predetermined temperature for a predetermined interval which corresponds to desired conditions for retort sterilization treatment to be applied to said low acid foods or drinks contained in said cans; applying said retort sterilization treatment to said low acid foods or drinks contained in said cans; detecting said visible color change of said thermal sensitive paints of said cans so that said cans with said thermal sensitive paints manifesting no visible color change are regarded as having been failed to get complete retort sterilization effect; classifying said cans into superior goods having said thermal sensitive paints manifesting visible color change and inferior goods having said thermal sensitive paints manifesting no visible color change; and removing said inferior goods from a supply line.

4. The method as claimed in claim 3 wherein said thermal sensitive paints are prepared as printing inks and descriptions and marks on said can including dates of packing of said cans are marked on outer walls thereof with said printing inks made of said thermal sensitive paints.

5. A method for detecting inferior goods among thin wall soft type cans, wuch as aluminum, which have been filled with low acid foods or drinks having pH value of more than 5.0 and a quantity of liquid nitrogen, then hermetically sealed and then subjected to retort sterilization treatment at a predetermined steam temperature for a predetermined period, said quantity of said liquid nitrogen being gasified in said cans to increase internal pressure thereof to a predetermined pressure level, which comprises the steps of applying thermal sensitive paints to the exterior surface of said respective cans prior to said retort sterilization treatment, said thermal sensitive paints having inherent nature of manifesting visible color change when exposed to a steam of a predetermined temperature for a predetermined period which corresponds to said conditions for said retort sterilization treatment; detecting said visible color change of said thermal sensitive paints of said can so that cans with said thermal sensitive paints manifesting no visible color change are regarded as having been failed to get complete retort sterilization effect; detecting presence of cans having internal pressure not reached to said predetermined pressure level; and thus detecting inferior goods among said canned foods which have said thermal sensitive paints manifesting no visible color change and internal pressure unreached to said predetermined pressure level.

6. The method as claimed in claim 5 wherein said thermal sensitive paints are prepared as printing inks and descriptions and marks of said can including dates of packing of said cans are marked on outer walls thereof with said printing inks made of said thermal sensitive inks.

7. The method as claimed in claim 5 wherein internal pressure of said cans is directly measured for a tapping test is applied to said cans to detect the presence of cans having internal pressure not reached to said predetermined predetermined pressure level.

* * * * *